(12) United States Patent
Kim et al.

(10) Patent No.: US 7,167,607 B2
(45) Date of Patent: Jan. 23, 2007

(54) SYMMETRIC OPTICAL MODULATOR WITH LOW DRIVING VOLTAGE

(75) Inventors: Woo Kyung Kim, Gunpo-si (KR); Woo Seok Yang, Seongnam-si (KR); Han Young Lee, Yongin-si (KR)

(73) Assignee: Korea Electronics Technology Institute, Gyeonggi-do (KR)

( * ) Notice: Subject to any disclaimer, the term of this patent is extended or adjusted under 35 U.S.C. 154(b) by 0 days.

(21) Appl. No.: 11/183,636

(22) Filed: Jul. 18, 2005

(65) Prior Publication Data

US 2006/0140530 A1 Jun. 29, 2006

(30) Foreign Application Priority Data

Dec. 28, 2004 (KR) .................. 10-2004-0114465

(51) Int. Cl.
*G02F 1/035* (2006.01)
*G02F 1/01* (2006.01)
*G02F 1/295* (2006.01)
*G02B 6/26* (2006.01)
*G02B 6/42* (2006.01)
*H01L 21/00* (2006.01)

(52) U.S. Cl. .................. 385/3; 385/1; 385/2; 385/4; 385/8; 385/39; 385/40; 385/45; 438/29; 438/31; 438/42

(58) Field of Classification Search .......... 385/1–4, 385/8, 39–42, 45; 428/29, 31, 42
See application file for complete search history.

(56) References Cited

U.S. PATENT DOCUMENTS

| 5,790,719 | A | 8/1998 | Mitomi et al. |
| 2001/0046341 | A1 | 11/2001 | Nakabayashiz |
| 2005/0201686 | A1* | 9/2005 | Cole et al. .................. 385/40 |
| 2006/0147145 | A1* | 7/2006 | Shinriki et al. .................. 385/3 |

FOREIGN PATENT DOCUMENTS

| EP | 1271220 | 1/2003 |
| JP | 2003/202530 | 7/2003 |

OTHER PUBLICATIONS

Kazuto Noguchi et al., A Broadband Ti: LiNbO3 Optical Modulator with a Ridge Structure, Jun. 1, 1995, vol. 13, No. 6, Journal of Lightwave Technology, New York, NY.

* cited by examiner

*Primary Examiner*—Brian Healy
*Assistant Examiner*—Derek L. Dupuis
(74) *Attorney, Agent, or Firm*—Ober/Kaler

(57) ABSTRACT

A symmetric optical modulator with low driving voltage, wherein polarization of any one of branched waveguides formed on a substrate is inverted, and the two branched waveguides are simultaneously controlled by a center electrode formed on a top portion thereof, thereby ensuring a low voltage driving and embodying a characteristic of there being no signal distortion due to chirp.

1 Claim, 8 Drawing Sheets

THICKNESS OF BUFFER LAYER [μm]

THICKNESS OF BUFFER LAYER [μm]

SYMMETRIC OPTICAL MODULATOR WITH LOW DRIVING VOLTAGE

CROSS-REFERENCE TO RELATED APPLICATIONS

The present application derives priority from Korean Patent Application No. 2004-0114465 Filed Dec. 28, 2004.

BACKGROUND OF THE INVENTION

1. Field of the Invention

The present invention relates to a symmetric optical modulator with low driving voltage, and more particularly, to a symmetric optical modulator with low driving voltage, wherein polarization of any one of branched waveguides formed on a substrate is inverted, and the two branched waveguides are simultaneously controlled by a center electrode formed on a top portion thereof, ensuring a low voltage driving and featuring no signal distortion generated by chirp.

2. Description of the Related Art

Generally, optical modulators refer to optical devices, wherein a radio frequency (RF) is applied to an electrode located on a top surface of a $LiNbO_3$ substrate so that optical characteristics of optical waveguides can be changed, whereby change of outputted light is so induced as to identify itself with a shape of the input RF signal.

The optical modulator is largely classified into two kinds of modulators according to crystal orientation of an $LiNbO_3$ substrate and mutual locations of optical waveguides, each kind being referred to as a z-cut optical modulator and an x-cut optical modulator.

FIGS. 1 and 2 are plan and sectional views schematically showing a structure of a general z-cut optical modulator. The z-cut optical modulator (100) comprises an $LiNbO_3$ substrate (101), an optical waveguide (102) formed by diffusing Ti onto a top surface of the $LiNbO_3$ substrate (101), a buffer layer (103) coated onto an entire top surface of the $LiNbO_3$ substrate (101), and three electrodes (104, 105, 106) formed on a top surface of the buffer layer (103) to transmit electric signals to the waveguide (102).

The electrode (105) positioned at the center of the three electrodes (104, 105, 106) is a positive electrode, and the other electrodes (104, 106) are ground electrodes.

A concept of operating the z-cut optical modulator thus constructed will now be described. Laser light is inputted to an optical waveguide, branched off from branched optical waveguides, and combined into an output optical waveguide and then outputted.

If a voltage difference between the center electrode (104) and the outer electrodes (106, 104) is produced by an RF signal applied to the center electrode (105), a phase velocity of the laser light transmitted to an optical waveguide located underneath the center electrode (104) is decreased whereas a phase velocity of the laser light transmitted to an optical waveguide located underneath the right electrode (106) is increased. As a result, when the two laser lights reach the output optical waveguide, the lights show a phase difference of 180° and then are cancelled out, so that an optical signal of '0' is outputted from the output optical waveguide.

On the other hand, if no voltage difference between the center electrode (104) and the outer electrodes (106,105) is produced, the laser lights transmitted to the optical waveguides are reinforced, so that an optical signal of '1' is outputted from the output optical waveguide.

Meanwhile, to maximize efficiency of an optical modulator, it is essential to fabricate electrodes with minimized RF loss while meeting phase velocity matching between light and RF, 50Ω impedance matching of electrodes, and the like.

To meet all the above characteristics at the same time, a buffer layer thicker than is necessary is required. Further, this increase in the thickness of the buffer layer reduces the intensity of electric fields applied to optical waveguides, resulting in necessity of much higher driving voltage.

There have been conducted many studies on minimizing the increase of the driving voltage due to the aforementioned causes.

FIGS. 3 and 4 are schematic plan and sectional views showing a structure of a general z-cut optical modulator with low driving voltage, respectively. The z-cut modulator (200) with low driving voltage comprises a $LiNbO_3$ substrate (201) provided with two protruding regions (201a, 201b) on a top surface thereof, an optical waveguide (202) formed by diffusing Ti into each of the protruding regions (201a, 201b) on the top surface of the $LiNbO_3$ substrate (201), a buffer layer (203) applied on an entire surface of the $LiNbO_3$ substrate (201), and three electrodes (204, 205, 206) formed on a top surface of the buffer layer (203) to transmit electric signals to the waveguide (202).

The z-cut optical modulator (200) with low driving voltage ensures phase velocity matching with light and impedance matching even in the buffer layer (203), which is thinner than that of the conventional structures, by etching portions of the substrate (201) existing between the electrodes (204, 205, 206).

Accordingly, the driving voltage can be greatly reduced. Such a structure is well known in the prior art (U.S. Pat. No. 5,790,719), so that a detailed description thereof will be omitted herein.

However, since the intensity of electric fields applied to the optical waveguide located underneath the center electrode (204) is several times larger than that of the optical waveguide located underneath the outer electrode (206) due to the difference in locations of the two waveguides, intensity variations and phase shifts of the outputted light are produced.

A signal distortion caused by the phase shift is called chirp, which acts as a major constraint to the long distance transmission as amount of transmission is further increased. As a result, in the case of a large-capacity optical communication of which transmission rate is above 40 Gbps, an x-cut modulator with almost no chirps is preferably used.

FIGS. 5 and 6 are plan and sectional views schematically showing a structure of the general x-cut optical modulator, respectively. The x-cut modulator (300) comprises an $LiNbO_3$ substrate (301), an optical waveguide (302) formed by diffusing Ti into a top surface of the $LiNbO_3$ substrate (301), a buffer layer (303) applied onto an entire surface of the $LiNbO_3$ substrate (301), and three electrodes (304, 305, 306) formed on a top surface of the buffer layer (303) to transmit electric signals to regions where the optical waveguide (302) is not formed.

Unlike the z-cut modulator, the optical waveguide can be located between electrodes in such an x-cut optical modulator. Therefore, chirp can be minimized because two optical waveguides are symmetrically located.

However, there is a problem in that the driving voltage is in high since the intensity of electric fields applied to the optical waveguides in the x-cut modulator is relatively small as compared with that of the z-cut modulator. There is another problem in that this modulator is not greatly different from the modulator shown in FIGS. 1 and 2, in view of their thickness of the buffer layer.

Accordingly, there are urgent and earnest needs for a novel electrode structure capable of maximizing the intensity of electric fields applied to an optical waveguide while maintaining a symmetric characteristic of an x-cut modulator.

SUMMARY OF THE INVENTION

The present invention is conceived to solve the aforementioned problems. Accordingly, an object of the present invention is to provide a symmetric optical modulator with a low driving voltage, wherein polarization of any one of branched optical waveguides formed on a substrate is inverted, and the two branched optical waveguides are simultaneously controlled by a center electrode formed on a top portion thereof, ensuring a low voltage driving and featuring no signal distortion due to chirp.

According to an aspect of the present invention for achieving the object, there is provided a symmetric optical modulator with low driving voltage, comprising a substrate; an optical waveguide which is composed of an input portion, a pair of first and second branch portions branched off from the input portion, and an output portion where the first and second branch portions are combined, all of which are formed inwardly on a top surface of the substrate; an inverted polarization region defined by a region of the substrate including any one of the first and second branch portions of the optical waveguide; first to third grooves formed by etching portions of the substrate adjacent to sides of the first and second branch portions of the optical waveguide; a buffer layer formed on the top surface of the substrate; a center electrode formed on a top surface of the buffer layer over the first and second branch portions of the optical waveguide located on and between the first and third grooves; and first and second side electrodes independent of the center electrode and formed on the top surface of the buffer layer adjacent to the first and third grooves, respectively.

According to another aspect of the present invention for achieving the object, there is provided a symmetric optical modulator with a low driving voltage, comprising a substrate; an optical waveguide composed of an input portion, a pair of first and second branch portions branched off from the input portion, and an output portion where the first and second branch portions are combined, all of which are formed inwardly on a top surface of the substrate; a polarization inversion region polarized and inverted by a region of the substrate including any one of the first and second branch portions of the optical waveguide; first to third grooves formed by etching portions of the substrate adjacent to sides of the first and second branch portions of the optical waveguide; a buffer layer formed on a top surface of the first and second branch portions and the second groove; a center electrode formed on a top surface of the buffer layer over the first and second branch portions of the optical waveguide located on and between the first and third grooves; and first and second side electrodes independent of the center electrode and formed on the top surface of the buffer layer adjacent to the first and third grooves, respectively.

According to a further aspect of the present invention for achieving the object, there is provided a method for fabricating a symmetric optical modulator with a low driving voltage, comprising the steps of: forming an optical waveguide, which is composed of an input portion, a pair of first and second branch portions branched off from the input portion, and an output portion where the first and second branch portions are combined, on the substrate; inverting and polarizing a region of the substrate including any one region of the first and second branch portions of the optical waveguide; forming first to third grooves by etching portions of the substrate of side surfaces of the first and second branch portions of the optical waveguide; applying a buffer layer onto a top surface of the substrate; forming first and second mask layers respectively on regions of the buffer layer over the first and third grooves excluding the second groove located between the first and second branch portions, and then forming a center electrode and first and second side electrodes on a top surface of the buffer layer divided by the first and second mask layers; and removing the first and second mask layers, and then removing portions of the buffer layer below the first and second mask layers.

BRIEF DESCRIPTION OF THE DRAWINGS

The above and other objects, features and advantages of the present invention will become apparent from the following descriptions of preferred embodiments given in conjunction with the accompanying drawings, in which:

FIGS. 9a to 9f are schematic sectional views for illustrating a process of fabricating a symmetric optical modulator with a low driving voltage according to the present invention;

DETAILED DESCRIPTION OF THE INVENTION

Hereinafter, preferred embodiments of the present invention will be described in detail with reference to the accompanying drawings.

Figure 1:
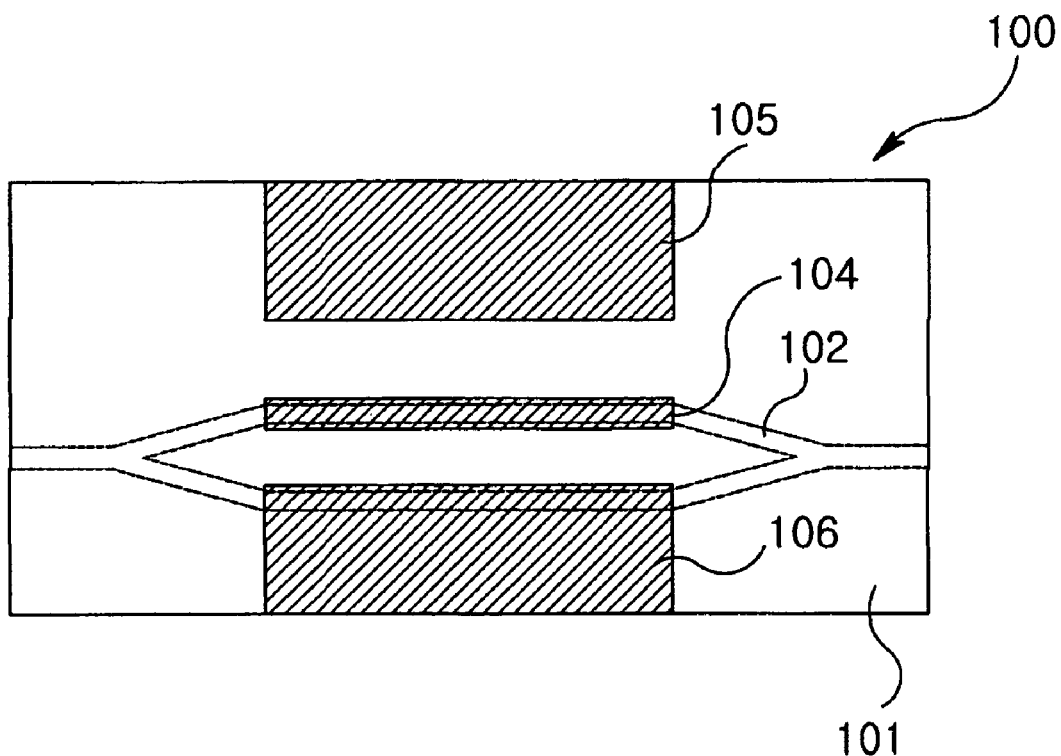
FIG. 1 (Prior Art) is a schematic plan view showing a structure of a general z-cut optical modulator.
Figure 2:
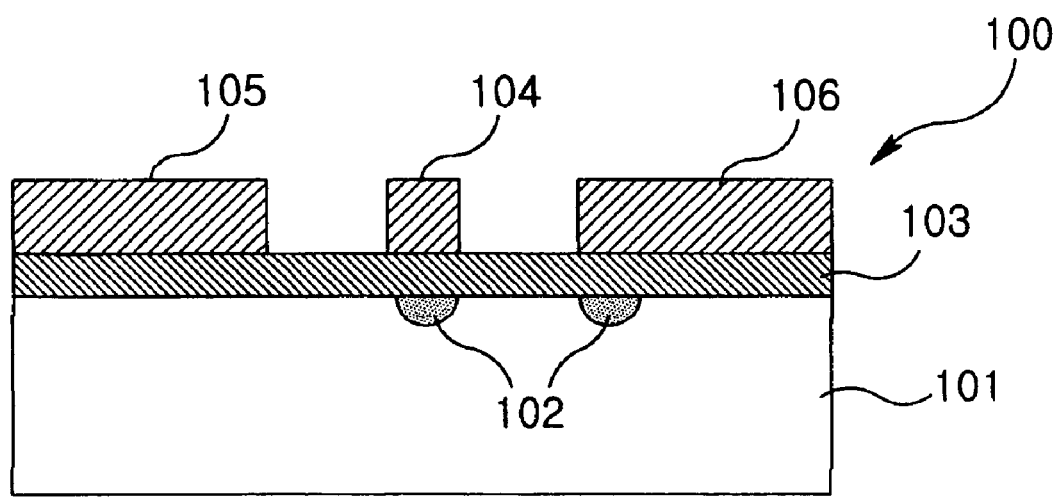
FIG. 2 (Prior Art) is a schematic sectional view showing a structure of a general z-cut optical modulator.
Figure 3:
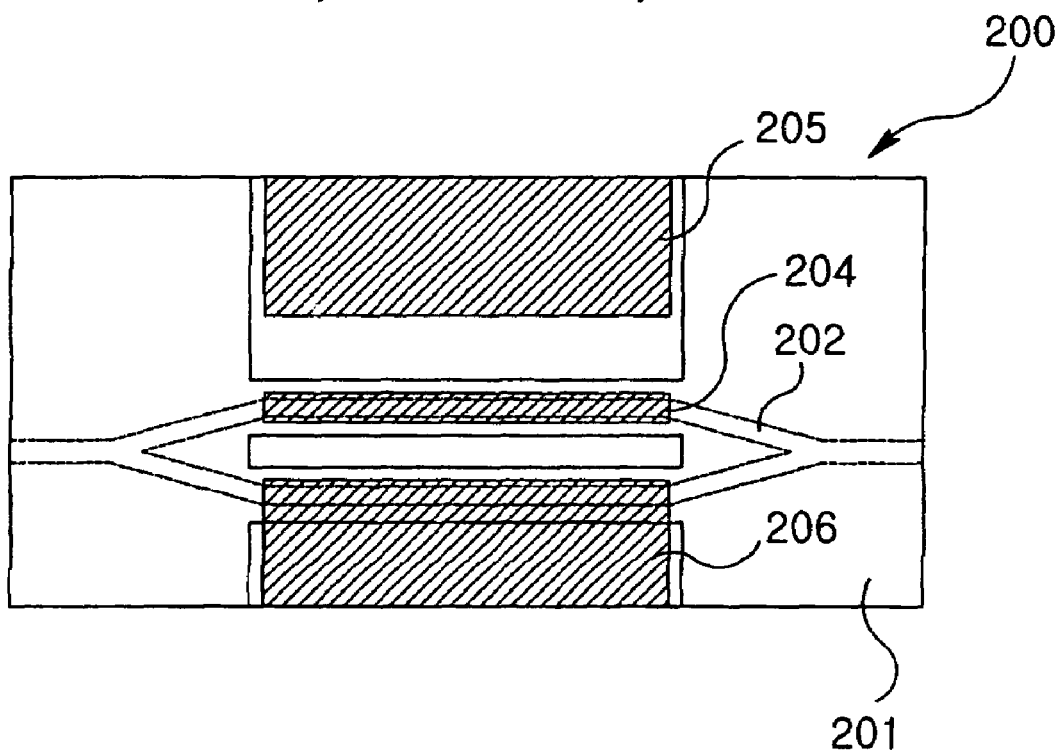
FIG. 3 (Prior Art) is a schematic plan view showing a structure of a general z-cut optical modulator with a low driving voltage.
Figure 4:
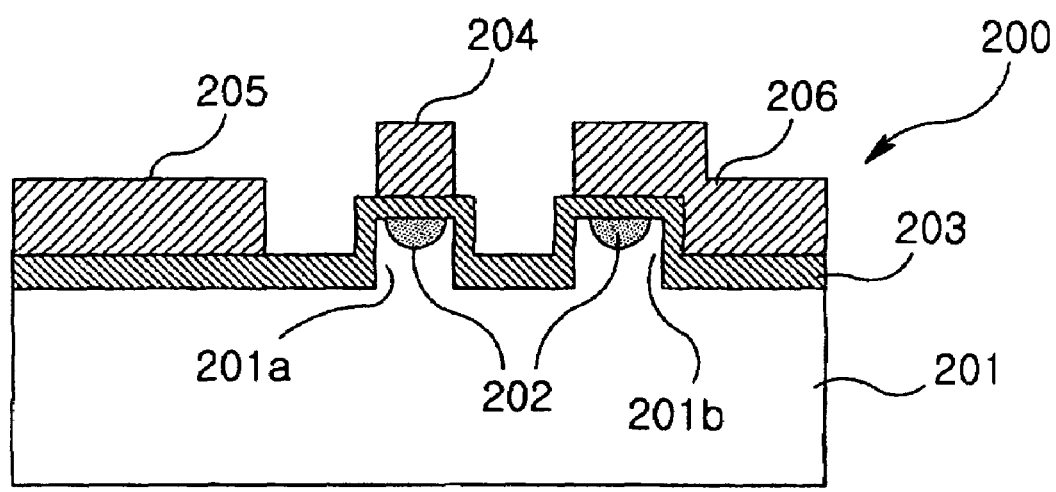
FIG. 4 (Prior Art) is a schematic sectional view showing a structure of a general z-cut optical modulator with a low driving voltage.
Figure 5:
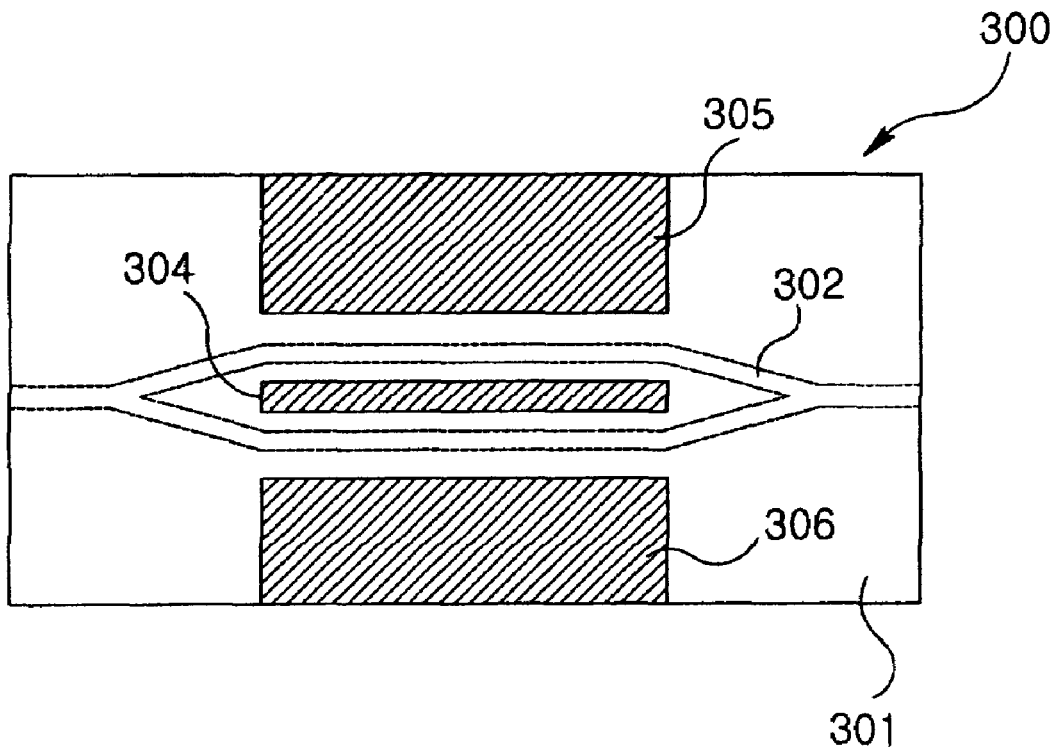
FIG. 5 (Prior Art) is a schematic plan view showing a structure of a general x-cut optical modulator.
Figure 6:
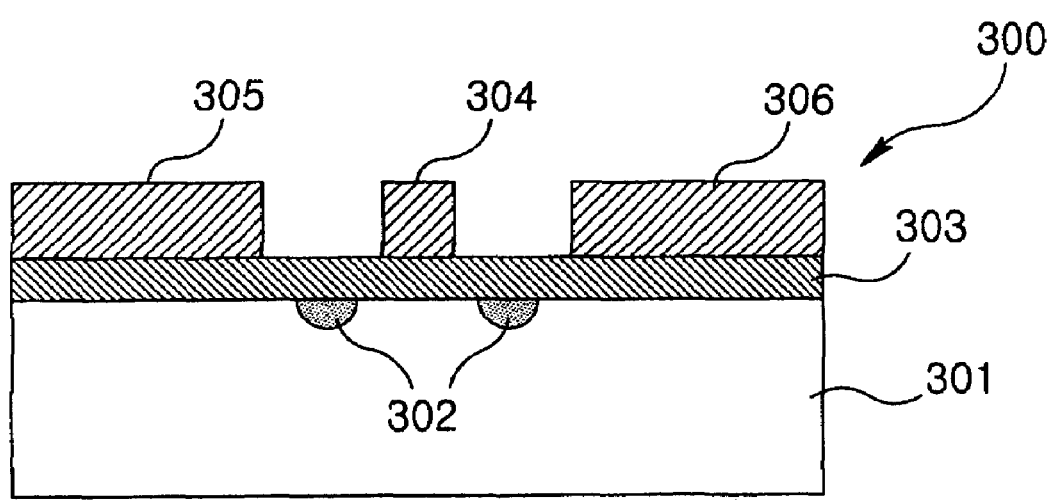
FIG. 6 (Prior Art) is a schematic sectional view showing a structure of a general x-cut optical modulator.
Figure 7:
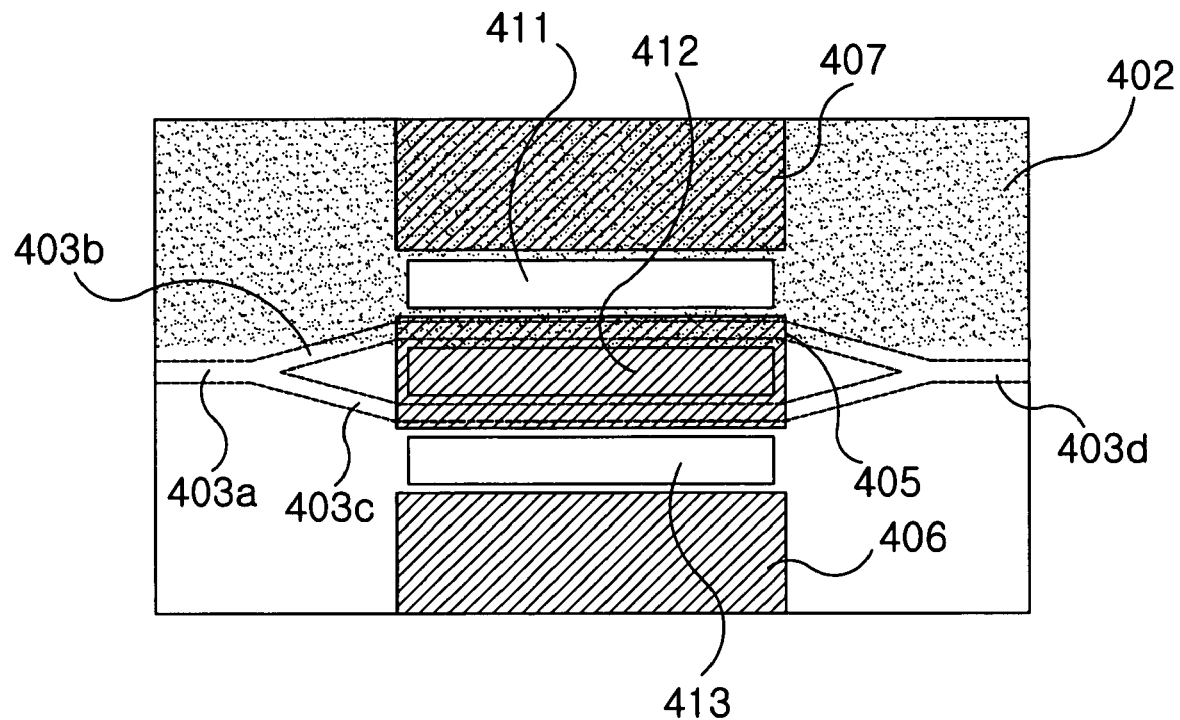
FIG. 7 is a schematic plan view of a symmetric optical modulator with a low driving voltage according to the present invention.
Figure 8:
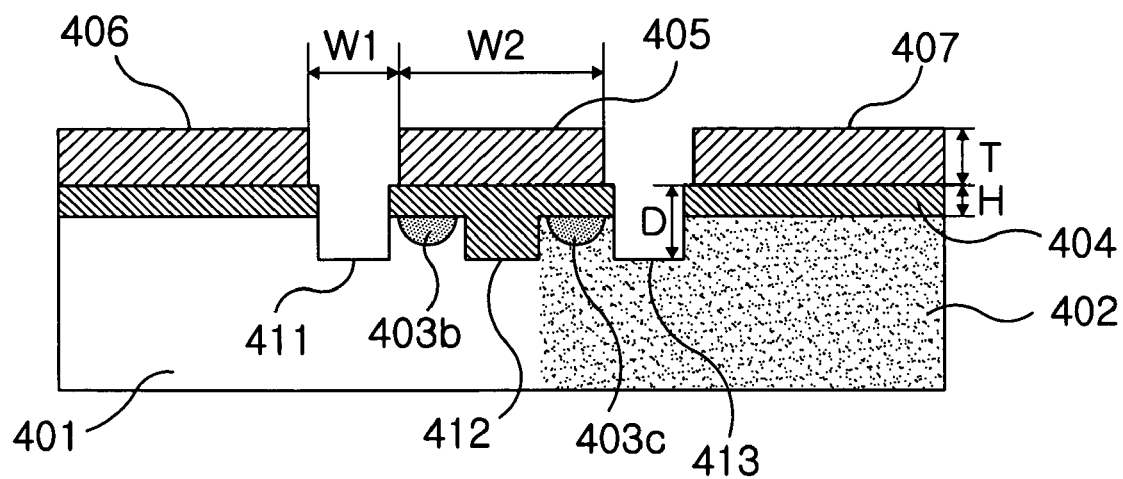
FIG. 8 is a schematic sectional view of a symmetric optical modulator with a low driving voltage according to the present invention.

Referring to FIGS. 7 and 8, the symmetric optical modulator with a low driving voltage according to the present invention comprises a substrate (401); an optical waveguide composed of an input portion (403a), a pair of first and second branch portions (403b, 403c) branched off from the input portion (403a), and an output portion (403d) where the first and second branch portions (403b, 403c) are combined, all of which are formed inwardly on a top surface of the substrate (401); first to third grooves (411, 412, 413) that are formed by etching portions of the substrate (401) adjacent to the sides of the first and second branch portions (403b, 403c) of the optical waveguide; a buffer layer (404) that is formed on all the top surface of the substrate (401) except the first and second grooves (411, 413); a center electrode (405) that is formed on a top surface of the buffer layer over the first and second branch portions (403b, 403c) of the optical waveguide located between the first and third grooves (411, 413); and first and second side electrodes (406, 407) that are independent of the center electrode (405) and formed on the top surface of the buffer layer adjacent to the first and third grooves (411, 413), respectively.

Preferably, the optical waveguide is formed by diffusing Ti into the top surface of the substrate (401).

Preferably, the substrate (401) is a ferroelectric substrate, and more preferably an $LiNbO_3$ substrate.

The optical modulator of the present invention is configured in such a manner that the same electric field is applied to the first and second branch portions (403b, 403c) of the optical waveguide due to the structural symmetry if signals are applied to the center electrode (405) and the side electrodes (406, 407).

A phase velocity of the light is changed by causing a refractive index of the electric field applied to the first and second branch portions (403b, 403c) of the optical waveguide to be changed. If the two optical waveguides of the same characteristics are positioned in the substrate, the changes in phase velocities thereof are also of the same.

Considering that the optical waveguide structure used in the present invention employs a phase difference between two waveguides, if the changes in the phase velocities of the two waveguides are of the same therebetween, i.e. if a constant phase difference is kept in the waveguides, the light modulation cannot occur.

Accordingly, since the polarization of one region of the substrate delimited by any one of the two optical waveguides is inverted according to the present invention, the refractive index of the one region is increased while the refractive index of the other region is decreased even though the same electric fields are applied to both regions.

Now, operation of the symmetric optical modulator with low driving voltage of the present invention will be explained in more detail with reference to FIG. 8. If a positive voltage is applied to the center electrode (405) and a negative voltage is applied to the first and second side electrodes (406, 407), a light transmitted from the first branch portion (403b) of the optical waveguide is changed to a phase of 90° and a light transmitted from the second branch portion (403c) positioned in the polarization inversion region (402) is changed to a phase of −90°.

Therefore, if a voltage is applied, a light is cancelled out in the output portion of the waveguide so that an optical signal of '0' is output. If a voltage is not applied, a light is reinforced in the output portion of the waveguide so that an optical signal of '1' is output.

Further, since the center electrode (405) should control both the branch portions (403b, 403c) of the waveguide in the symmetric optical modulator with low driving voltage according to the present invention, the width of the center electrode is greater than that of the conventional structure.

This increased width decreases electrode impedance and delays an RF phase velocity, which can directly cause the bandwidth limitation and efficiency reduction of the optical modulator. However, since the first to third grooves (411, 412, 413) are formed by etching regions of the substrate between the branch portions and between the electrodes according to the present invention, an effect caused by the increased width of the center electrode is be cancelled out.

That is, if the width of the center electrode is increased, the impedance is decreased and the RF phase velocity is also delayed. This can result directly in the bandwidth limitation and efficiency reduction of the optical modulator.

However, since the present invention is provided with the first to third grooves (411, 412, 413) formed by etching predetermined regions of the substrate, capacitance produced by the substrate between the center electrode (405) and the first and second side electrodes (406, 407) can be reduced. Therefore, the impedance can be increased, and thus, the RF phase velocity can be further increased.

In addition, as the width of the center electrode is increased, RF conductor loss is also greatly decreased. Accordingly, a voltage drop of RF propagating along the electrodes can be minimized, and thus, the modulator with low driving voltage of maximized modulation efficiency can be also implemented.

Figure 9A:
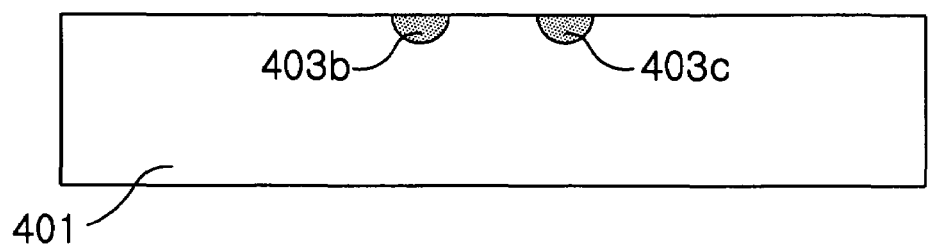

FIGS. 9a to 9f are sectional views schematically illustrating a process of fabricating the symmetric optical modulator with low driving voltage according to the present invention. Referring to FIG. 9a, Ti is diffused into the top surface of the substrate (401) such that the optical waveguide including an input portion, a pair of first and second branch portions (403b, 403c) branched off from the input portion, and an output portion where the first and second branch portions (403b, 403c) are combined can be formed on the substrate (401).

Figure 9B:
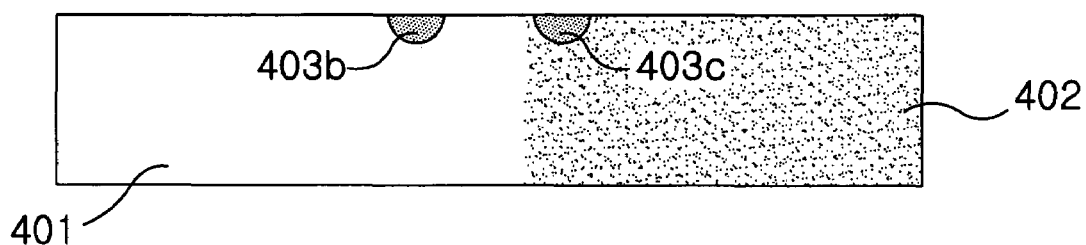

Thereafter, the polarization of the region (402) of the substrate (401), delimited by the first or second branch portion (403b or 403c) of the optical waveguide, is inverted (FIG. 9b).

Figure 9C:
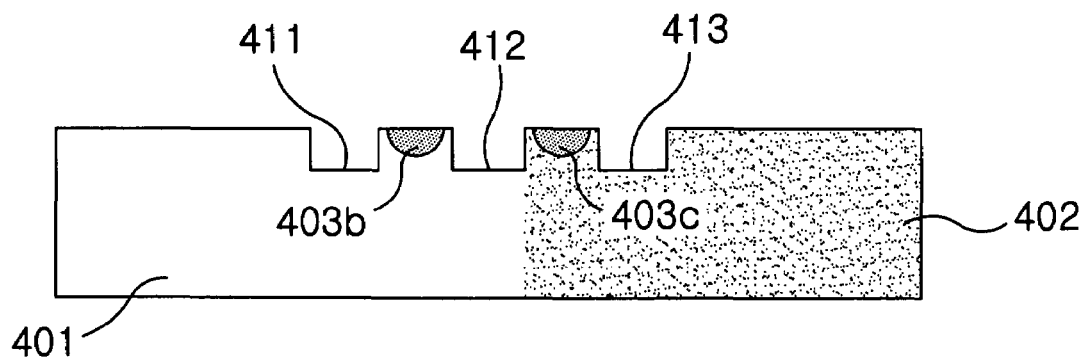

Next, some regions of the substrate adjacent to the sides of the first and second branch portions (403b, 403c) of the optical waveguide are etched such that the first to third grooves (411, 412, 413) are formed (FIG. 9c).

Figure 9D:
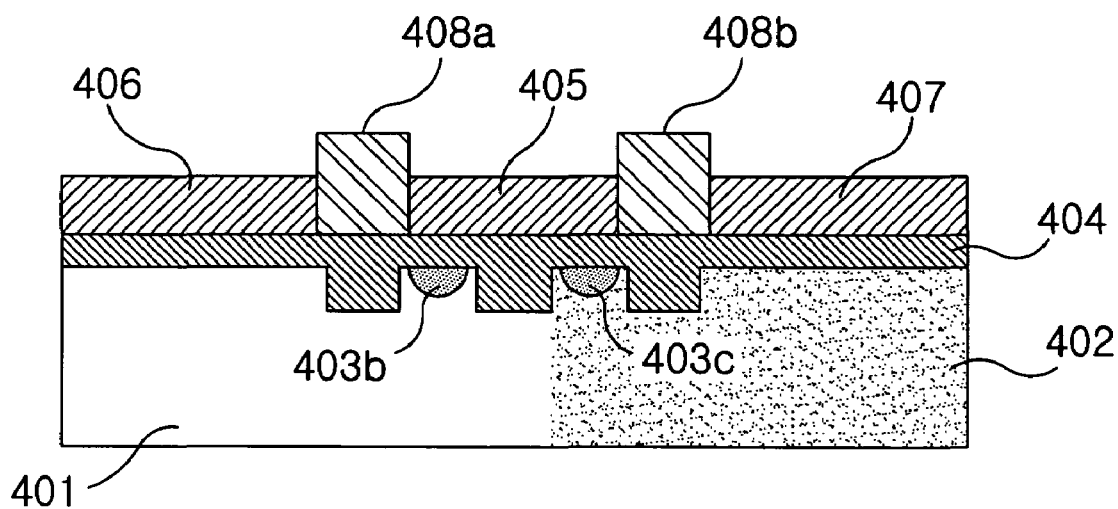

Successively, a buffer layer (404) is applied onto the top surface of the substrate (401), and first and second mask layers (408a, 408b) are formed on the regions of the buffer layer on the first and third grooves (411, 413) except for the second groove (412) located between the first and second branch portions (403b, 403c) of the optical waveguide, and the center electrode (405) and the first and second side electrodes (406, 407) are formed on the top surface of the buffer layer, which are divided by the first and second mask layers (408a, 408b) (FIG. 9d).

Figure 9E:
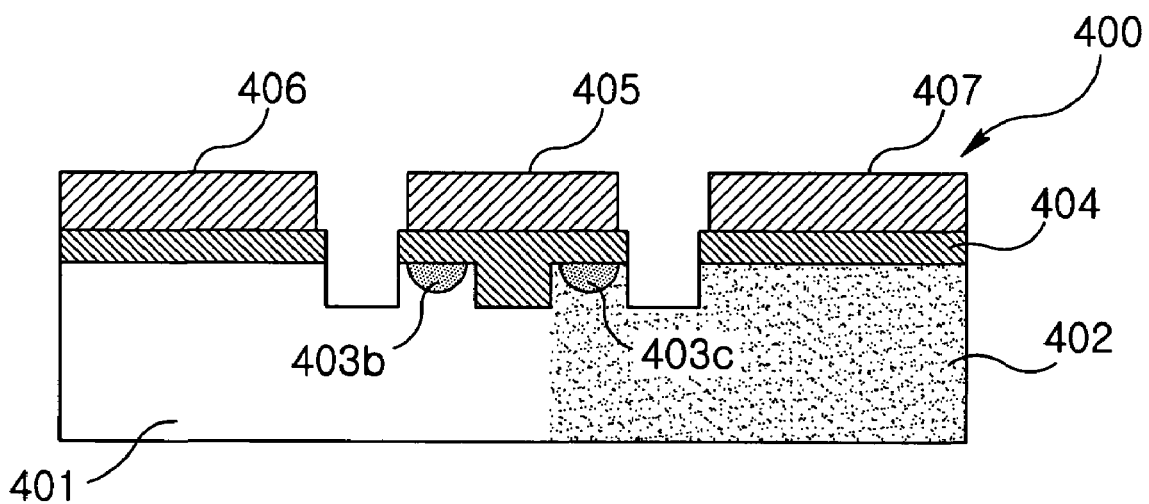

Henceforth, the first and second mask layers (408a, 408b) are removed, and the buffer layers below the mask layers are also removed (FIG. 9e).

As a result, once the process of FIG. 9e is finished, the fabrication of the optical modulator according to the present invention is completed.

Figure 10:
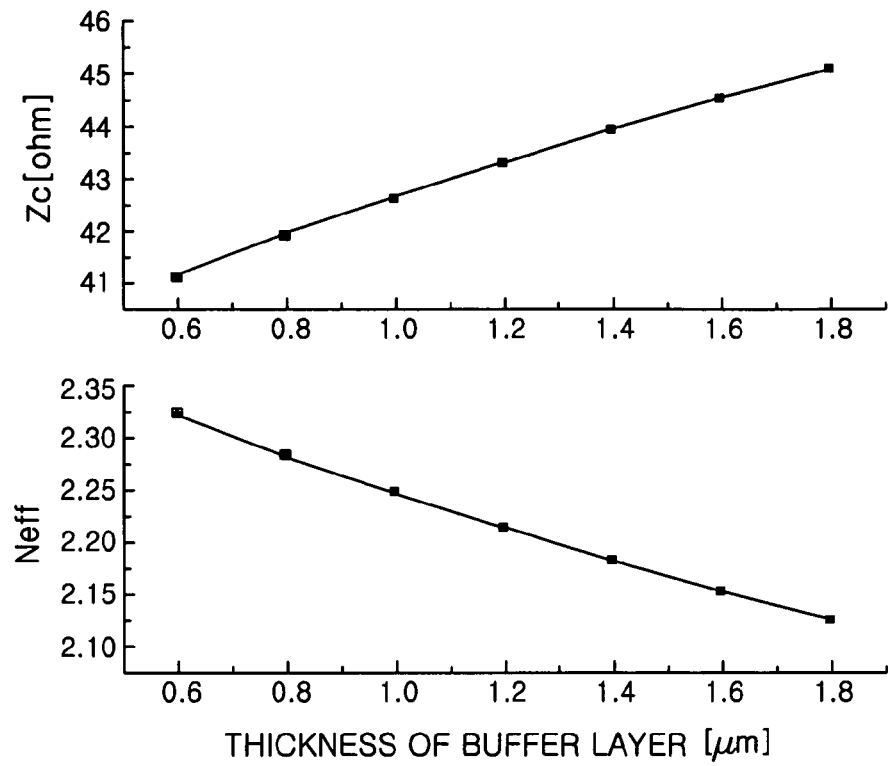
FIGS. 10 and 11 are graphical renditions plotting characteristic impedances, effective refractive indexes, RF attenuation constants, and multiplications of driving voltage by modulation lengths according to thickness variation of a buffer layer in the structure shown in FIG. 8.
Figure 11:
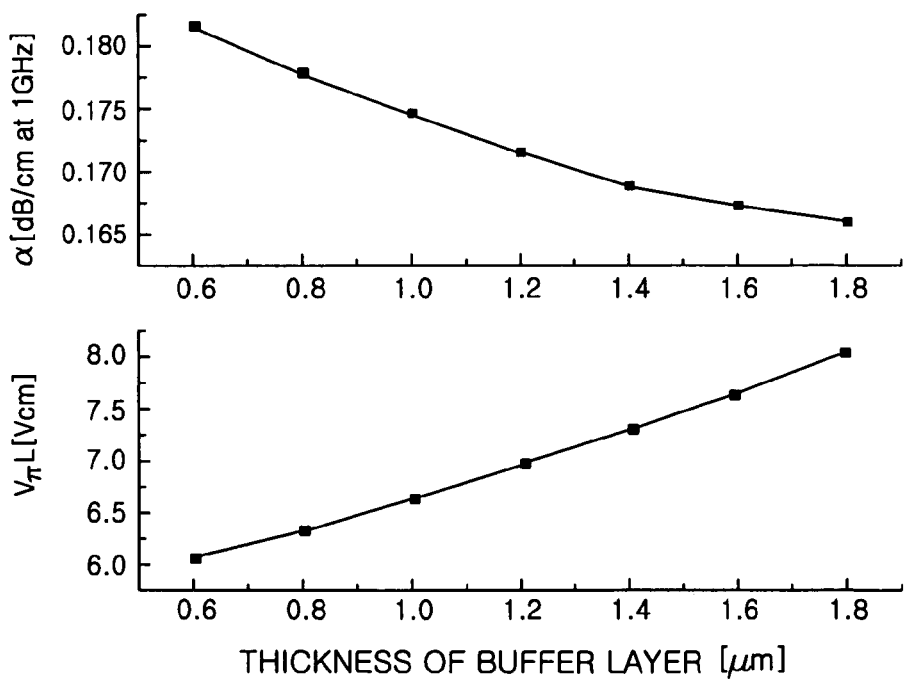

FIGS. 10 and 11 are graphs plotting characteristic impedances, effective refractive indexes, RF attenuation constants, and multiplications of driving voltage by modulation lengths according to the variation in the thickness of the buffer layer in the structure shown in FIG. 8. FIG. 8 shows the characteristic impedances (Zc), effective refractive indexes (Neff), RF attenuation constants (a) and multiplications of the driving voltage by the modulation lengths (VπL) according to the variation in the thickness (H) of the buffer layer when the width (W1) of the center electrode is 24 μm, the width (W2) of the first and third grooves is 35 μm, the depth (D) of the first and third grooves is 8 μm, and the thickness (T)

of the electrodes is 27 μm in the symmetric optical modulator with low driving voltage according to the present invention.

First, when the thickness (H) of the buffer layer is approximately 1.6 μm, it can be understood that the characteristic impedance is 45 ohms and the effective refractive index is 2.14 as shown in FIG. 10, and that the RF attenuation constant (α) is 0.165 and the multiplication of the driving voltage by the modulation length is kept as low as 7.75 V·cm as shown in FIG. 11.

It is shown that the above results exactly accord with the object of the symmetric optical modulator with low driving voltage according to the present invention thus described, and that the efficiency is more greatly improved than that of the existing other optical modulator structures.

Further, since the symmetric optical modulator with low driving voltage according to the present invention is configured such that the regions between the electrodes and between the first and second branch portions of the optical located below the center electrode are etched, mutual energy exchange between the first and second branch portions of the optical waveguide is prevented and thus the characteristic of there being no signal distortion by chirp can be embodied.

Furthermore, preferably the thickness of the buffer layer is within a range of 0.8 to 2 μm such that the effective refractive index can be adjusted to 2.15 in consideration of the width (W1) of the center electrode, the width (W2) of the first and third grooves, and the depth of the first and third grooves.

Figure 12:
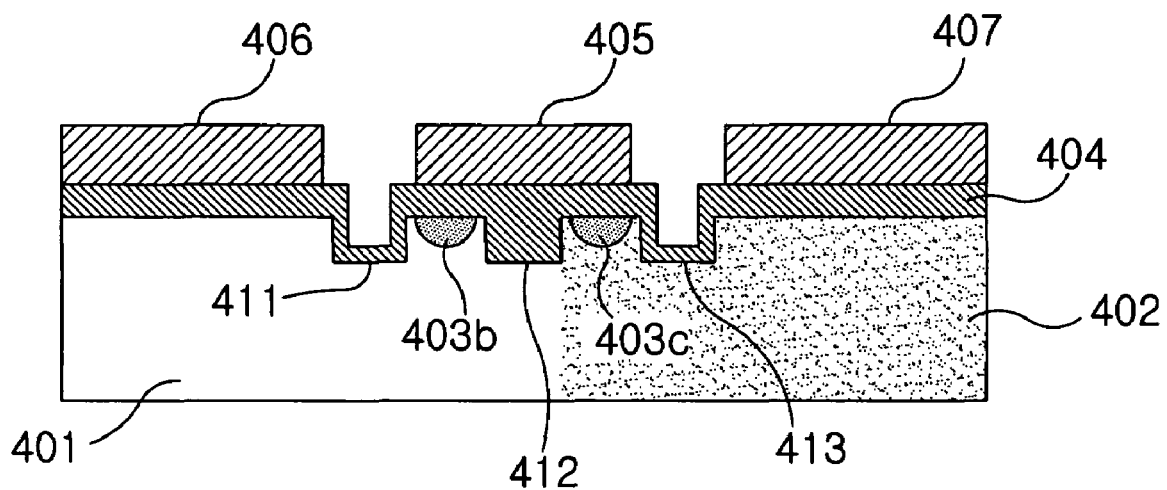
FIG. 12 is a schematic sectional view according to a first embodiment of the present invention.

FIG. 12 is a schematic sectional view of a first embodiment according to the present invention. The symmetric optical modulator with low driving voltage according to the present invention includes a substrate (401); an optical waveguide composed of an input portion (403a), a pair of first and second branch portions (403b, 403c) branched off from the input portion (403a), and an output portion (403d) where the first and second branch portions (403b, 403c) are combined, all of which being formed inwardly on a top surface of the substrate (401); a polarization inversion region (402) corresponding to a region of the substrate (401) delimited by the first or second branch portion (403b, 403c) of the optical waveguide; first to third grooves (411, 412, 413) formed by etching portions of the substrate (401) adjacent to the sides of the first and second branch portions (403b, 403c) of the optical waveguide; a buffer layer (404) formed on the top surface of the substrate (401) including the first to third grooves (411, 412, 413); a center electrode (405) formed on a top surface of the buffer layer over the first and second branch portions (403b, 403c) of the optical waveguide located on and between the first and third grooves (411, 413); and first and second side electrodes (406, 407) each being independent of the center electrode (405) and formed on the top surface of the buffer layer adjacent to the first and third grooves (411, 413).

Figure 13:
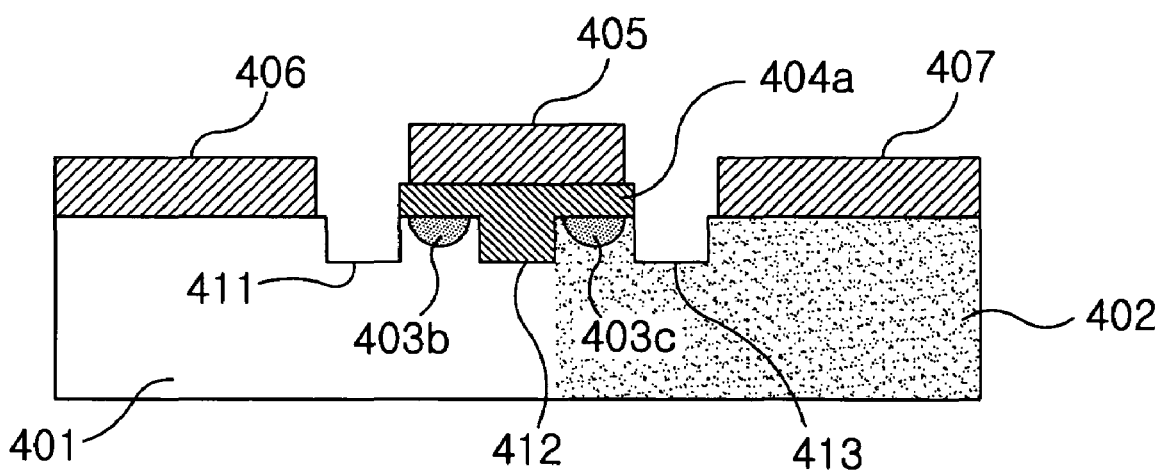
FIG. 13 is a schematic sectional view according to a second embodiment of the present invention.

FIG. 13 is a schematic sectional view of a second embodiment according to the present invention. The symmetric optical modulator with low driving voltage according to the present invention includes a substrate (401); an optical waveguide composed of an input portion (403a), a pair of first and second branch portions (403b, 403c) branched off from the input portion (403a), and an output portion (403d) where the first and second branch portions (403b, 403c) are combined, all of which being formed inwardly on a top surface of the substrate (401); a polarization inversion region (402) corresponding to a region of the substrate (401) delimited by the first or second branch portion (403b, 403c) of the optical waveguide; first to third grooves (411, 412, 413) formed by etching portions of the substrate (401) adjacent to the sides of the first and second branch portions (403b, 403c) of the optical waveguide; a buffer layer (404) formed on a top surface of the first and second branch portions (403b, 403c) and the second groove (412); a center electrode (405) formed on a top surface of the buffer layer over the first and second branch portions (403b, 403c) of the optical waveguide located on and between the first and third grooves (411, 413); and first and second side electrodes (406, 407) each being independent of the center electrode (405) and formed on the top surface of the buffer layer adjacent to the first and third grooves (411, 413).

As apparent from the foregoing, the present invention is configured such that polarization of a region delimited by any one of the branched portions of the optical waveguide formed on the substrate is inverted, and the two branched portions of the optical waveguides are simultaneously controlled by the center electrode formed on the top surface of the polarization inversion region. Therefore, there is an excellent advantage in that the low voltage driving can be ensured and a characteristic of there being no signal distortion by chirp can also be implemented.

Although the present invention has been described in detail in connection with the specific embodiments, it will be readily understood by those skilled in the art that various modifications and changes can be made thereto within the technical spirit and scope of the present invention. It is also apparent that the modifications and changes fall within the scope of the present invention defined by the appended claims.

What is claimed is:

1. A method for fabricating a symmetric optical modulator with low driving voltage comprising the steps of:

forming an optical waveguide on a substrate, said optical waveguide being composed of an input portion, a pair of first and second branch portions branched off from the input portion, and an output portion where the first and second branch portions are combined;

inverting and polarizing a region of the substrate including any one region of the first and second branch portions of the optical waveguide;

applying a buffer layer onto a top surface of the substrate;

forming first and second mask layers on regions of the buffer layer over a first and third grooves excluding a second groove located between the first and second branch portions, and then forming a center electrode and first and second side electrodes on a top surface of the buffer layer divided by the first and second mask layers; and removing the first and second mask layers, and then removing portions of the buffer layer below the first and second mask layers.

* * * * *